(12) United States Patent
Baus et al.

(10) Patent No.: US 9,312,109 B2
(45) Date of Patent: Apr. 12, 2016

(54) HIGH PRESSURE ION CHAMBER ENCLOSURE SUPPORT MOUNT

(71) Applicant: General Electric Company, Schenectady, NY (US)

(72) Inventors: Edward Joseph Baus, Akron, OH (US); Joseph Paul Constant, Aurora, OH (US); Kenneth Keith Lambach, Munroe Falls, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 258 days.

(21) Appl. No.: 13/749,771

(22) Filed: Jan. 25, 2013

(65) Prior Publication Data

US 2014/0209812 A1 Jul. 31, 2014

(51) Int. Cl.
*H01J 47/00* (2006.01)
*H01J 47/02* (2006.01)
*H01J 9/00* (2006.01)
*G01T 1/185* (2006.01)

(52) U.S. Cl.
CPC .............. *H01J 47/02* (2013.01); *G01T 1/185* (2013.01); *H01J 9/00* (2013.01); *H01J 47/002* (2013.01); *Y10T 29/49002* (2015.01)

(58) Field of Classification Search
CPC ............................... H01J 47/002; H01J 47/02
USPC ......................................................... 250/389
See application file for complete search history.

(56) References Cited

U.S. PATENT DOCUMENTS

| 4,300,050 A    | *  | 11/1981 | Hizo et al. ............. 250/374   |
| 2008/0159476 A1 |    | 7/2008  | Koltick et al.                      |
| 2008/0169424 A1 | *  | 7/2008  | Beyerle .............. 250/385.1    |
| 2011/0220811 A1 | *  | 9/2011  | Dick et al. ............. 250/424   |

FOREIGN PATENT DOCUMENTS

| WO | WO 2012115516 A2 * | 8/2012 |             |
| WO | WO 2012121768 A2 * | 9/2012 | ..... G01T 1/20 |

OTHER PUBLICATIONS

An analytic theory of the point-source non-uniformity correction factor for thick-walled ionisation chambers in photon beam, Phys. Med. Biol., 1990, vol. 35, No. 4, 517-538 to Bielajew et al.*
"Gas Spherical Ionization Chamber", Journal of Radioanalytical and Nuclear Chemistry, p. 361-366 (Nov. 2011).*
"The non-uniformity correction factor for the cylindrical ionization chambers in dosimetry of an HDR 192Ir brachytherapy source", J Med Phys. Apr.-Jun. 2006; 31(2) to Majumdar et al.*
International Search Report and Written Opinion issued in connection with corresponding PCT Application No. PCT/US2013/078190 dated Jul. 16, 2014.
Henry, "measure atomic radiation Part II Ion chamber meters and a G-M counter you can build", Radio Electronics Sep. 1962, pp. 43-45, Jan. 1, 1962, pp. 43-45, XP055127231.

* cited by examiner

*Primary Examiner* — Mark R Gaworecki
*Assistant Examiner* — Kenneth J Malkowski
(74) *Attorney, Agent, or Firm* — Cooper Legal Group

(57) ABSTRACT

A radiation detection assembly includes an ionization chamber for detecting radiation. An exterior enclosure houses the ionization chamber within an interior volume. A pair of support structures support the ionization chamber with respect to the exterior enclosure. The support structures are disposed opposite each other at a surface of the ionization chamber such that the ionization chamber is symmetric with respect to an axis extending between the support structures. A method of supporting the radiation detection assembly is also provided.

20 Claims, 3 Drawing Sheets

HIGH PRESSURE ION CHAMBER ENCLOSURE SUPPORT MOUNT

BACKGROUND OF THE INVENTION

1. Field of the Invention

The present invention relates generally to radiation detection assemblies and, in particular, to a radiation detection assembly supported by at least one support structure.

2. Discussion of the Prior Art

Environmental radiation monitors are known and used to detect an amount of radiation at a locality. Radiation monitors can be deployed in the field proximate to a radiation source, such as a nuclear power generation station, to monitor radiation levels.

In one type of radiation monitor, an ionization chamber is utilized. The ionization chamber is housed within an enclosure. In the past, the ionization chamber was surrounded by a foam material. The relatively dense foam material reduced sensitivity of the ionization chamber by blocking gamma radiation. Additionally, the ionization chamber included electronics or other gamma blocking materials oppositely disposed with the ionization chamber oriented at an angle with respect to vertical. This angled orientation tended to further block gamma radiation and reduce sensitivity of the ionization chamber. Accordingly, there is a need and it would be beneficial to support the ionization chamber without the foam material and improve the orientation of the ionization chamber to increase gamma radiation sensitivity.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a radiation detection assembly includes an ionization chamber for detecting radiation. An exterior enclosure houses the ionization chamber within an interior volume. A pair of support structures supports the ionization chamber with respect to the exterior enclosure. The support structures are disposed opposite each other at a surface of the ionization chamber such that the ionization chamber is symmetric with respect to an axis extending between the support structures.

In accordance with another aspect, the present invention provides a radiation detection assembly includes an ionization chamber for detecting radiation. An exterior enclosure houses the ionization chamber within an interior volume. A pair of support structures supports the ionization chamber a distance apart from the exterior enclosure. The support structures are disposed opposite each other at a surface of the ionization chamber such that the ionization chamber is symmetric with respect to an axis extending between the support structures. The ionization chamber being non-contacted along the surface extending between the opposing support structures.

In accordance with another aspect, the present invention provides a method of supporting a radiation detection assembly. The method includes the steps of providing an exterior enclosure having an interior volume. The method further includes positioning an ionization chamber within the interior volume. The method also includes supporting the ionization chamber with respect to the exterior enclosure with a pair of support structures disposed opposite each other at a surface of the ionization chamber.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
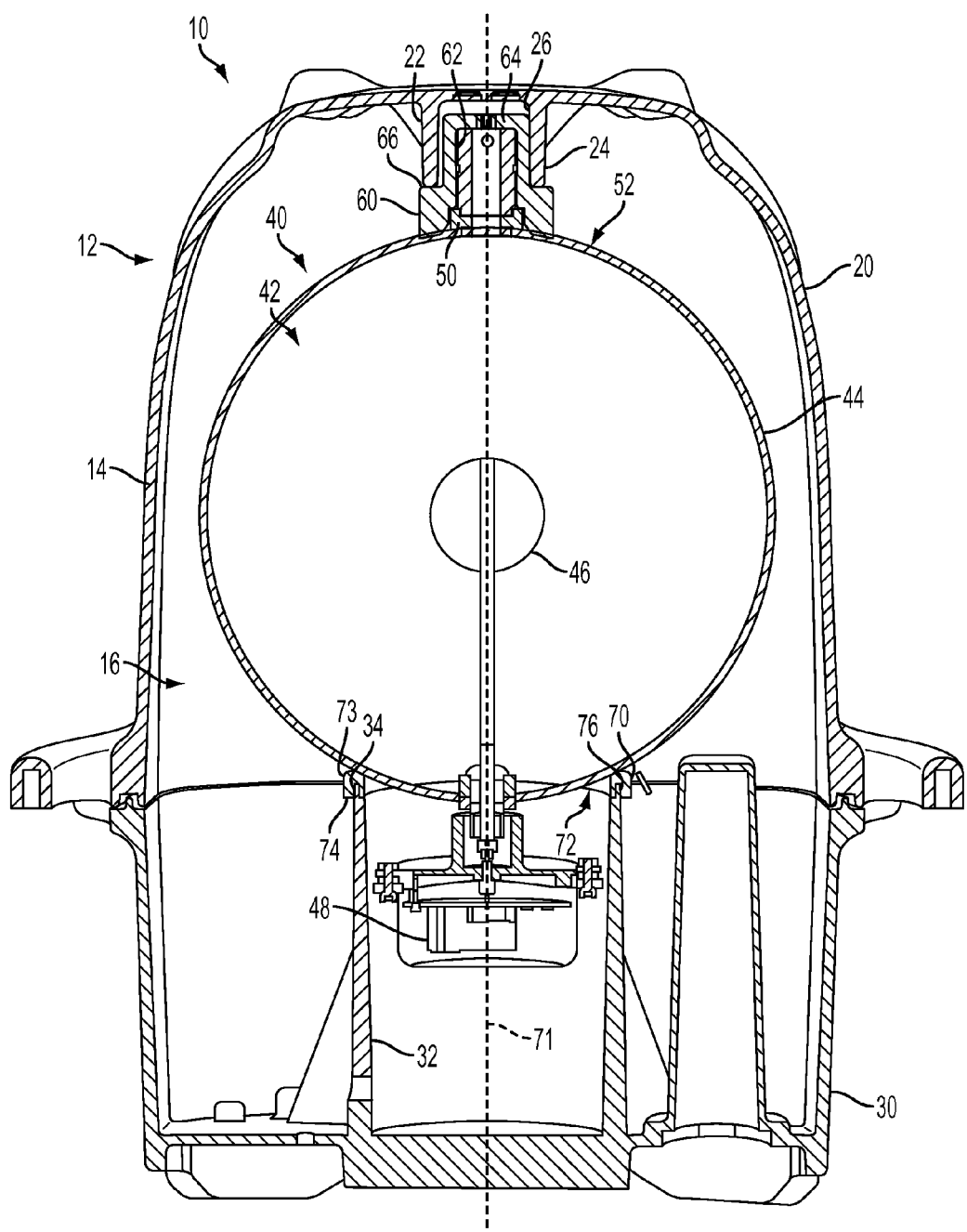
FIG. 1 is a partially torn open view of an example radiation detection assembly including an example ionization chamber supported by one or more support structures in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example embodiment of a partially torn open radiation detection assembly 10 in accordance with one aspect of the invention. It is to be appreciated that FIG. 1 merely shows one example of possible structures/configurations and that other examples are contemplated within the scope of the present invention. In general, the radiation detection assembly 10 is placed at an exterior location to perform the function of monitoring low-level gamma radiation in the local area atmosphere. The gamma radiation may be from known or unknown sources.

The radiation detection assembly 10 includes an exterior enclosure 12. The exterior enclosure 12 includes an exterior wall 14 that bounds an interior volume 16. In this example, the exterior enclosure 12 has a generally ellipsoid/ovoid shape, though other shapes are envisioned. For instance, in other examples, the exterior enclosure 12 includes a cuboid shape or other multi-sided three dimensional shapes of varying sizes. It is to be appreciated that the exterior enclosure 12 is depicted as being partially torn open in FIG. 1 for illustrative purposes and to more clearly show the interior volume 16. In operation, however, the exterior enclosure 12 is fully enclosed such that the interior volume 16 is not normally visible. The exterior wall 14 is formed of a rigid, generally inflexible material that provides protection to the interior volume 16 from environmental effects (e.g., moisture, debris, etc.). The exterior enclosure 12 includes any number of different materials, including polymeric materials (e.g., plastics, etc.), metals, combinations of materials, or the like.

The exterior enclosure 12 includes a first enclosure portion 20. The first enclosure portion 20 forms one portion of the exterior enclosure 12. The first enclosure portion 20 forms an upper or top portion of the exterior enclosure 12 in the shown example. The first enclosure portion 20 is closed at one end (e.g., top end) and is generally open at an opposing second end (e.g., bottom end). In one possible example, the first enclosure portion 20 forms more than half of the length of the exterior enclosure 12. However, in other examples, the first enclosure portion 20 could be longer or shorter in length than as shown.

The first enclosure portion 20 includes a retaining structure 22 disposed within the first enclosure portion 20. The retaining structure 22 extends from the exterior wall 14 into the interior volume 16. The retaining structure 22 is, in the shown example, integrally formed/molded with the exterior wall 14. Of course, in further examples, the retaining structure 22 is not so limited, and instead could be separately attached with respect to the exterior wall 14. In one example, the retaining structure 22 extends from the exterior wall 14 towards an end 24 of the retaining structure 22. The retaining structure 22 can include a generally circumferential cross-sectional shape. In other examples, however, the retaining structure 22 is not limited to having a circular cross-section, and instead could have a square, rectangular, oval, etc. cross-section. Likewise, the retaining structure 22 can extend a longer or shorter distance into the interior volume 16 than as shown. The retaining structure 22 is generally hollow, defining a cavity 26.

The exterior enclosure 12 includes a second enclosure portion 30. The second enclosure portion 30 forms one portion of the exterior enclosure 12. The second enclosure portion 30 forms a lower or bottom portion of the exterior enclosure 12 in the shown example. The second enclosure portion 30 is closed at one end (e.g., bottom end) and is generally open at an opposing second end (e.g., top end). In one possible example, the first enclosure portion 20 forms more than half of the length of the exterior enclosure 12. However, in other examples, the first enclosure portion 20 could be longer or shorter in length than as shown.

The second enclosure portion 30 can be attached to the first enclosure portion 20, as shown. For instance, the open ends of each of the first enclosure portion 20 and second enclosure portion 30 can be brought together and attached to each other. In one example, the first enclosure portion 20 and second enclosure portion 30 may each include threading structures (e.g., corresponding male and female threads) so as to threadingly attach to each other. In other examples, mechanical fasteners, snap fit means, etc. may instead be used to attach the first enclosure portion 20 to the second enclosure portion 30.

The second enclosure portion 30 includes a base portion 32 disposed within the second enclosure portion 30. The base portion 32 extends from the exterior wall 14 into the interior volume 16. The base portion 32 is, in the shown example, integrally formed/molded with the exterior wall 14. Of course, in other examples, the base portion 32 is not so limited, and instead could be separately attached with respect to the exterior wall 14. In one example, the base portion 32 extends from the exterior wall 14 towards an end 34 of the base portion 32. The base portion 32 can include a generally circumferential cross-sectional shape. In other examples, however, the base portion 32 is not limited to having a circular cross-section, and instead could have a square, rectangular, oval, etc. cross-section. Likewise, the base portion 32 can extend a longer or shorter distance into the interior volume 16 than as shown.

The radiation detection assembly 10 further includes an ionization chamber 40 for detecting radiation. The ionization chamber 40 is contained/housed within the interior volume 16 of the exterior enclosure 12. The ionization chamber 40 bounds a volume 42 that provides space for individual components of the ionization chamber 40. It is to be appreciated that the ionization chamber 40 in FIG. 1 is sectioned off so as to more clearly show the volume 42. In operation, however, the ionization chamber 40 will be fully enclosed such that the volume 42 is not visible. It is to be understood that the ionization chamber 40 includes a number of possible arrangements. In one example, the ionization chamber 40 may include a high pressure ionization chamber (HPIC). The ionization chamber 40 has a generally spherical shape, though other shapes are envisioned.

The ionization chamber 40 includes a pair of electrodes, including a cathode 44 and an anode 46. The cathode 44 bounds the volume 42. In one example, the cathode 44 is sealed and filled with a pressurized gas, such as nitrogen gas, argon, mixtures of other gases, etc. As such, this pressurized gas within the volume 42 is relatively limited from inadvertently leaking out of the ionization chamber 40. The cathode 44 can be constructed of various materials such as metals, including stainless steel, aluminum, etc.

The ionization chamber 40 further includes the anode 46 extending into the volume 42 of the cathode 44. The anode 46 can include a support member, wire, or the like. As such, the anode 46 is not limited to the size or shape of the shown example. In this example, the anode 46 has a smaller cross-sectional size than the cathode 44 such that the anode 46 is radially spaced inward and apart from the cathode 44.

In general, the cathode 44 and anode 46 are each maintained at a voltage. Ions and electrons resulting from gamma interactions are formed in the volume 42. These ions and electrons are drawn toward the cathode 44 and anode 46, whereupon they are collected to generate a current. An amplifier 48 (and/or other associated electronics including electrometers, wires, etc.) is electrically connected to the cathode 44 and anode 46. The amplifier 48 will receive and analyze the current to determine several measurable quantities pertaining to radiation, such as gamma dose rate, etc. The amplifier 48 can be housed within an amplifier housing or the like.

The ionization chamber 40 further includes a relief assembly 50. The relief assembly 50 is attached to a surface 52 of the ionization chamber 40. The relief assembly 50 will allow for the pressurized gas within the cathode 44 to safely vent to an exterior of the ionization chamber 40. The relief assembly 50 can be attached to the surface 52 in any number of ways, such as by welding, mechanical fasteners, etc.

The radiation detection assembly 10 further includes one or more support structures for supporting the ionization chamber 40 with respect to the exterior enclosure 12. In particular, the one or more support structures include a first support structure 60. The first support structure 60 can support the ionization chamber 40 a distance apart from the first enclosure portion 20 of the exterior enclosure 12.

The first support structure 60 is an elongated, substantially hollow structure that extends from the ionization chamber 40 towards the first enclosure portion 20. The first support structure 60 can include a number of different materials, such as an elastomeric material (e.g., rubber, etc.) or the like. In one example, the first support structure 60 is capable of at least partially elastically deforming in response to a force or pressure. Accordingly, the first support structure 60 can reduce vibrations, shocks, or other unintended movements from propagating through the exterior enclosure 12 to the ionization chamber 40.

The first support structure 60 includes an internal chamber 62 that is substantially hollow. The internal chamber 62 extends longitudinally at least partially along the length of the first support structure 60. The internal chamber 62 is sized and shaped to receive a portion of the ionization chamber 40 therewithin. In the shown example, the internal chamber 62 receives the relief assembly 50. The internal chamber 62 has a cross-sectional size and shape that substantially matches the cross-sectional size and shape of the relief assembly 50, but for being slightly larger so as to receive the relief assembly 50. In other examples, the internal chamber 62 includes any number of cross-sectional shapes, such as quadrilateral shapes (e.g., square, rectangular, etc.), circular shapes, oval shapes, or the like.

A support wall 64 is disposed at an end of the first support structure 60. In the shown example, the support wall 64 is positioned opposite the location of engagement of the first support structure 60 to the ionization chamber 40. The support wall 64 extends across the internal chamber 62 and defines a longitudinal end of the internal chamber 62. The support wall 64 can abut/engage the relief assembly 50 to limit further axial movement of the relief assembly 50 with respect to the first support structure 60 than as shown in FIG. 1.

The first support structure 60 further includes a shoulder 66. The shoulder 66 extends circumferentially around an outer perimeter/surface of the first support structure 60. In one example, the shoulder 66 has a larger cross-sectional size (e.g., diameter, width, etc.) than an adjacent portion of the first support structure 60. In the shown example, the shoulder 66 can engage the end 24 of the retaining structure 22. In particular, the shoulder 66 substantially matches a shape of the retaining structure 22 such that the engagement between the shoulder 66 and retaining structure 22 will form a seal. This engagement between the shoulder 66 and the retaining structure 22 will limit and/or prevent movement of the first support structure 60 with respect to the first enclosure portion 20.

It is to be appreciated that the first support structure 60 is shown as being slightly smaller in size than the retaining structure 22 in FIG. 1. Indeed, a gap, space, etc. is shown between an outer lateral surface of the first support structure 60 and an inner surface of the retaining structure 22. In operation, however, the gap, space, etc. could be smaller than as shown, or may be nonexistent. Indeed, the first support structure 60 may contact and engage the retaining structure 22 so as to limit movement (e.g., rotation, axial movement, lateral movement) of the first support structure 60 and the retaining structure 22. As such, due to the engagement of the first support structure 60 and the ionization chamber 40, the ionization chamber 40 is likewise limited from moving (e.g., rotation, axial movement, lateral movement).

The one or more support structures of the radiation detection assembly 10 further includes a second support structure 70. The second support structure 70 supports the ionization chamber 40 a distance apart from the second enclosure portion 30 of the exterior enclosure 12. In one example, the second support structure 70 is disposed opposite the first support structure 60 with respect to the ionization chamber 40. Indeed, to illustrate the respective positions of the second support structure 70 with respect to the first support structure 60, an axis 71 is shown to extend between the second support structure 70 and first support structure 60. As shown, the first support structure 60 and second support structure 70 are generally diametrically opposed to each other (e.g., defining antipodal points) with the axis 71 extending therebetween.

The second support structure 70 has a generally circular shape that engages the ionization chamber 40. It is to be appreciated that the second support structure 70 is not limited to the circular shape described herein, and in other examples, could have other rounded shapes, ellipsoid shapes, square shapes, or the like. The second support structure 70 can include an elastomeric material (e.g., rubber, etc.) or the like. The second support structure 70 has a generally hollow center 72 extending therethrough for receiving a portion of the ionization chamber 40. Accordingly, the second support structure 70 can reduce vibrations, shocks, or other unintended movements from propagating through the exterior enclosure 12 to the ionization chamber 40.

The second support structure 70 includes a first side 73 that engages the ionization chamber 40. In the shown example, the first side 73 is generally rounded and contacts/engages the surface 52 of the cathode 44. Due to the second support structure 70 being formed from the elastomeric material, the second support structure 70 can limit movement of the ionization chamber 40 with respect to the second support structure 70. The second support structure 70 is not limited to the cross-sectional size (e.g., diameter) in the shown example, and in other examples, could have a larger or smaller cross-sectional size than as shown.

The second support structure 70 further includes a second side 74 disposed opposite the first side 73. The second side 74 can engage the base portion 32 of the second enclosure portion 30. In particular, the second side 74 includes an engagement structure (e.g., a channel 76) for engaging and contacting the base portion 32 to limit movement of the second support structure 70 with respect to the base portion 32. The channel 76 defines a substantially hollow groove, opening, indentation, or the like that extends at least partially into the second support structure 70. In the shown example, the channel 76 extends partially from the second side 74 to the first side 73, such that the channel 76 does not extend completely through the second support structure 70. In other examples, the channel 76 could extend a longer or shorter distance into the second support structure 70 than as shown, and/or could be wider or narrower.

The channel 76 will receive the base portion 32. In particular, the end 34 of the base portion 32 is positioned to extend into the channel 76. The dimensions of the channel 76 can be slightly larger (e.g., in width) than the dimensions of the base portion 32, such that the channel 76 receives the base portion 32. The engagement between the channel 76 and the base portion 32 will limit movement of the second support structure 70 with respect to the base portion 32 of the second enclosure portion 30.

Figure 2:
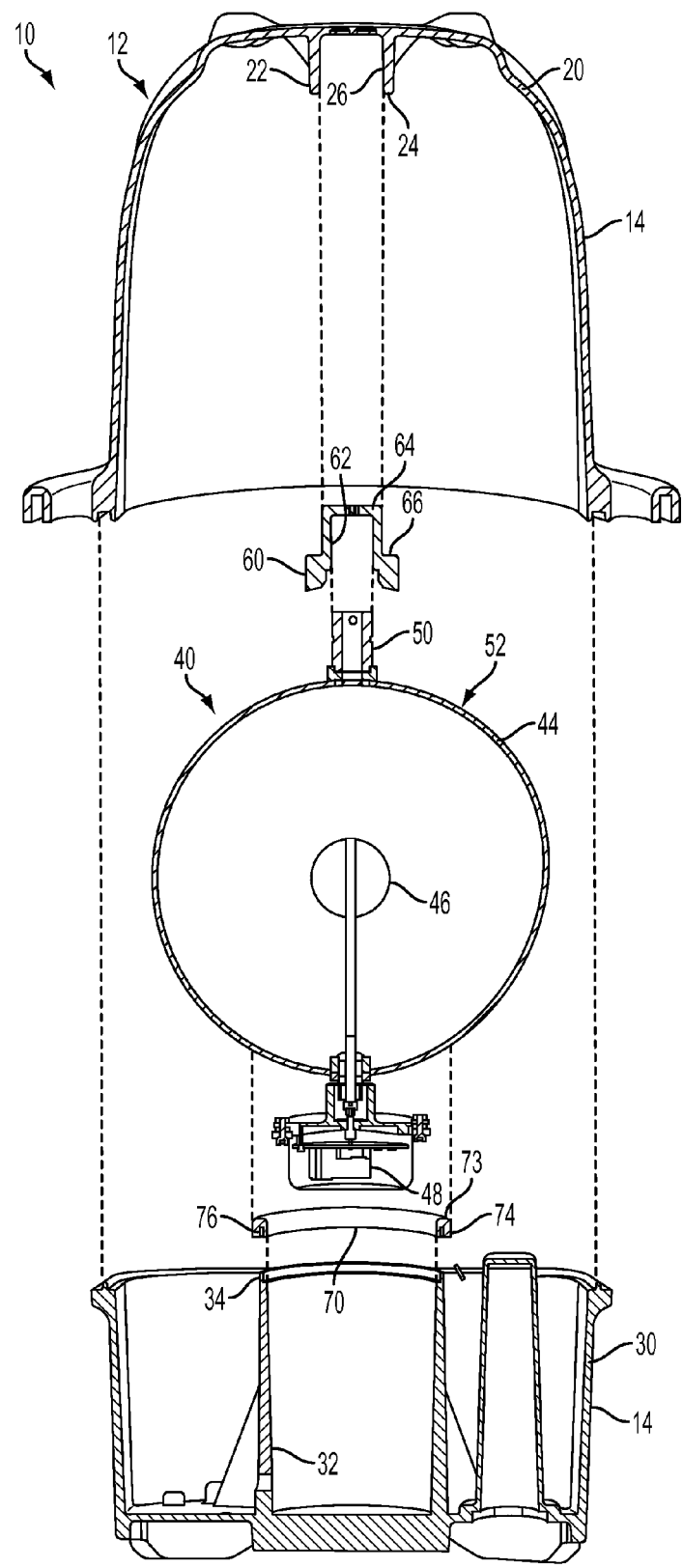
FIG. 2 is a partially exploded view of the radiation detection assembly of FIG. 1.

Turning now to FIG. 2, the operation of providing support within the radiation detection assembly 10 will now be described. It is to be appreciated that FIG. 2 depicts the radiation detection assembly 10 in a partially exploded state for illustrative purposes. Indeed, the relative attachment locations of portions of the radiation detection assembly 10 can be clearly seen in FIG. 2. However, in operation, the radiation detection assembly 10 will be in a fully assembled state, similar to that shown in FIG. 1.

The first enclosure portion 20 can initially be in a detached state from the second enclosure portion 30. The retaining structure 22 of the first enclosure portion 20 is sized and shaped to receive the first support structure 60. In particular, the cavity 26 of the retaining structure 22 will receive the first support structure 60 therewithin. The cross-sectional size and shape of the first support structure 60 can generally match that of the cavity 26, such that movement between the first support structure 60 and retaining structure 22 is limited/reduced. This movement includes, for example, axial, lateral (e.g., side to side), and rotational movement. The end 24 of the retaining structure 22 will abut the shoulder 66 of the first support structure 60, limiting further axial movement of the first support structure 60 towards the first enclosure portion 20.

Moving away from the first enclosure portion 20, the first support structure 60 can receive the relief assembly 50 of the ionization chamber 40. The relief assembly 50 is sized and shaped to fit within the internal chamber 62 of the first support structure 60. The cross-sectional size and shape of the internal chamber 62 can generally match that of the relief assembly 50, such that movement between the first support structure 60 and the relief assembly 50 of the ionization chamber 40 is limited. This movement includes, for example, axial, lateral (e.g., side to side), and rotational movement.

Moving away from the first support structure 60, the amplifier 48 of the ionization chamber 40 can be positioned to pass through the hollow center 72 of the second support structure 70. The amplifier 48 is positioned/housed within the base portion 32.

With the amplifier 48 located within the base portion 32, the second support structure 70 is sandwiched between the base portion 32 and the ionization chamber 40. In particular, the first side 73 of the second support structure 70 is in contact with ionization chamber 40 while the second side 74 is in contact with the base portion 32. The channel 76 of the second support structure 70 is sized and shaped to receive the end 34 of the second enclosure portion 30 in a relatively tight fit. Accordingly, due to the second support structure 70 including an elastomeric or other similar flexible material, the second support structure 70 will limit movement of the ionization chamber 40 with respect to the base portion 32 of the second enclosure portion 30. This movement includes, for example, axial, lateral (e.g., side to side), and rotational movement.

To ensure that the aforementioned structures remain in contact with each other, the first enclosure portion 20 and second enclosure portion 30 can be attached to each other. This attachment provides a compressive force acting upon the ionization chamber 40, first support structure 60, and second support structure 70. The compressive force is sufficient to maintain force upon the ionization chamber 40 with the first support structure 60 and second support structure 70 while limiting movement. The first enclosure portion 20 and second enclosure portion 30 can be attached to each other in any number of ways, such as by threading attachment, mechanical fasteners (e.g., nuts, bolts, screws, etc.), snap fit or locking means, or the like.

In operation, the first support structure 60 and second support structure 70 are disposed at generally opposite sides of the ionization chamber 40. In particular, the ionization chamber 40 is generally symmetric with respect to the axis 71 extending between the first support structure 60 and second support structure 70. This symmetric positioning will limit interference/blockage of sides of the ionization chamber 40. For instance, the surface 52 of the ionization chamber 40 extending between the first support structure 60 and second support structure 70 is generally non-contacted and non-supported. Indeed, as can be seen in FIGS. 1 and 2, the interior volume 16 is substantially hollow, with no material contacting and/or blocking the surface 52 of the ionization chamber 40. Accordingly, blockage of gamma radiation along sides of the ionization chamber 40 is reduced.

In addition, the first support structure 60 and second support structure 70 are each generally aligned/positioned in proximity to structures that may exhibit some degree of blockage of gamma radiation. For instance, the first support structure 60 is positioned adjacent and in contact with the relief assembly 50. In some examples, the relief assembly 50 is metal and may block at least some gamma radiation. By positioning the first support structure 60 near the relief assembly 50, one potential location of radiation blockage is minimized (i.e., at the relief assembly 50/first support structure 60 location). Likewise, the second support structure 70 is positioned in proximity to the amplifier 48. In some examples, the amplifier 48 is metal and may block at least some gamma radiation. By positioning the second support structure 70 near the amplifier 48, another potential location of radiation blockage is minimized (i.e., at the amplifier 48/second support structure 70 location). Accordingly, circumferential sensitivity (e.g., along the surface 52) of the ionization chamber 40 is improved.

By being symmetrically supported (e.g., support structures being symmetric with respect to axis 71), the ionization chamber 40 realizes further improvement in circumferential sensitivity along the surface 52. In particular, past ionization chambers were oriented at angles with respect to vertical, thus blocking gamma radiation along the sides of the ionization chambers. In the present example, the sides of the ionization chamber 40 are free from blockage due to the generally vertical orientation of the ionization chamber 40. As such, a maximum amount of the surface 52 is unblocked.

Figure 3:
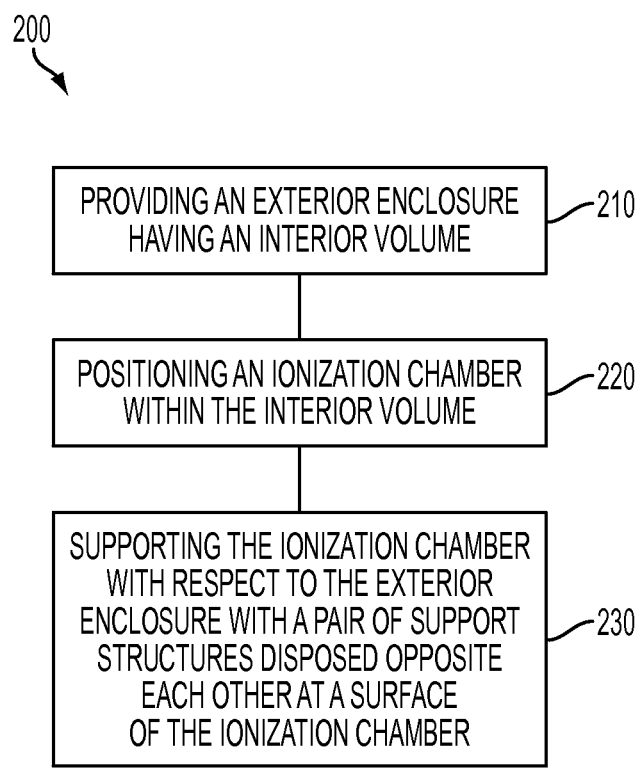
FIG. 3 is a flowchart depicting a method of supporting the radiation detection assembly of FIG. 1.

Turning now to FIG. 3, an example method 200 of supporting the radiation detection assembly 10 is shown. The method 200 can be performed in association with the radiation detection assembly 10, including the exterior enclosure 12, ionization chamber 40, etc., shown in FIGS. 1 and 2.

The method 200 includes a step 210 of providing the exterior enclosure 12 having the interior volume 16. In particular, as shown in FIGS. 1 and 2, the exterior enclosure 12 includes the exterior wall 14 that bounds the interior volume 16. The interior volume 16 is generally hollow.

The method 200 includes a step 220 of positioning the ionization chamber 40 within the interior volume 16. In particular, as shown in FIG. 2, the ionization chamber 40 is received within the interior volume 16 when the first enclosure portion 20 and second enclosure portion 30 are compressed and brought together in attachment.

The method 200 further includes a step 230 of supporting the ionization chamber 40 with respect to the exterior enclosure 12 with a pair of support structures disposed opposite each other at the surface 52 of the ionization chamber 40. In particular, as shown in FIGS. 1 and 2, the first enclosure portion 20 and second enclosure portion 30 are disposed at generally opposite sides of the ionization chamber 40. The first enclosure portion 20 and second enclosure portion 30 are compressed into contact with the ionization chamber 40. This compressive force is sufficient such that the first enclosure portion 20 and second enclosure portion 30 will limit movement (e.g., rotational, axial, lateral) of the ionization chamber 40 with respect to the exterior enclosure 12.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A radiation detection assembly for detecting radiation in a local area atmosphere, the assembly including:
   a spherical ionization chamber for receiving the radiation from the local area atmosphere and detecting the radiation, the ionization chamber having an outer surface;
   an exterior enclosure housing the ionization chamber within an interior volume, with the interior volume being substantially hollow and bounding space, with no material contacting the outer surface of the ionization chamber and blocking the outer surface of the ionization chamber from the radiation at the interior volume; and
   a pair of support structures supporting the ionization chamber with respect to the exterior enclosure, the support structures being disposed diametrically opposite each other at a surface of the ionization chamber such that the ionization chamber is symmetric with respect to an axis extending between the support structures through the ionization chamber.

2. The radiation detection assembly of claim 1, wherein the exterior enclosure includes a first enclosure portion and a second enclosure portion.

3. The radiation detection assembly of claim 2, wherein the pair of support structures includes a first support structure and a second support structure.

4. The radiation detection assembly of claim 3, wherein the first enclosure portion includes a retaining structure for engaging the first support structure and limiting movement of the ionization chamber with respect to the first enclosure portion.

5. The radiation detection assembly of claim 4, wherein the first support structure includes a shoulder, the first support structure being received within the retaining structure such that an end of the retaining structure engages the shoulder.

6. The radiation detection assembly of claim 3, wherein the first support structure includes a substantially hollow internal chamber that is sized and shaped to receive a portion of the ionization chamber.

7. The radiation detection assembly of claim 3, wherein the first support structure is attached to the ionization chamber.

8. The radiation detection assembly of claim 3, wherein the second enclosure portion includes a base portion for engaging the second support structure and limiting movement of the ionization chamber with respect to the second enclosure portion.

9. The radiation detection assembly of claim 8, wherein the second support structure includes a circular shape with a hollow center, the second support structure being sized to receive a portion of the ionization chamber within the hollow center.

10. The radiation detection assembly of claim 9, wherein the second support structure includes an elastomeric material such that movement between the ionization chamber and the second support structure is limited.

11. A radiation detection assembly for detecting radiation in a local area atmosphere, the assembly including:
  a spherical ionization chamber for receiving the radiation from the local area atmosphere and detecting the radiation, the ionization chamber having an outer surface;
  an exterior enclosure housing the ionization chamber within an interior volume, with the interior volume being substantially hollow and bounding space, with no material contacting the outer surface of the ionization chamber and blocking the outer surface of the ionization chamber from the radiation at the interior volume; and
  a pair of support structures supporting the ionization chamber a distance apart from the exterior enclosure, the support structures being disposed diametrically opposite each other at a surface of the ionization chamber such that the ionization chamber is symmetric with respect to an axis extending between the support structures through the ionization chamber, the ionization chamber being non-contacted along the surface extending between the opposing support structures.

12. The radiation detection assembly of claim 11, wherein the exterior enclosure includes a first enclosure portion and a second enclosure portion.

13. The radiation detection assembly of claim 12, wherein the pair of support structures includes a first support structure and a second support structure.

14. The radiation detection assembly of claim 13, wherein the first support structure and the second support structure each include an elastomeric material.

15. The radiation detection assembly of claim 14, wherein the first support structure and the second support structure each contact the ionization chamber such that movement between the ionization chamber and the support structures is limited.

16. The radiation detection assembly of claim 15, wherein the first support structure and second support structure provide a compressive force to the ionization chamber.

17. A method of supporting a spherical ionization chamber in a radiation detection assembly that is for detecting radiation in a local area atmosphere, with the chamber being configured to receive the radiation from the local area atmosphere and detect the radiation and the ionization chamber having an outer surface, the method including:
  providing an exterior enclosure having an interior volume, with the interior volume being substantially hollow and bounding space;
  positioning the spherical ionization chamber within the interior volume with no material contacting the outer surface of the ionization chamber and blocking the outer surface of the ionization chamber from the radiation at the interior volume; and
  supporting the ionization chamber with respect to the exterior enclosure with a pair of support structures disposed diametrically opposite each other at a surface of the ionization chamber such that the ionization chamber is symmetric with respect to an axis extending between the support structures through the ionization chamber.

18. The method of claim 17, further including the step of compressing opposing sides of the ionization chamber with the support structures.

19. The method of claim 18, further including the step of preventing movement of the ionization chamber with respect to the exterior enclosure.

20. The method of claim 19, wherein the support structures include an elastomeric material.

* * * * *